(12) United States Patent
Kawai

(10) Patent No.: US 8,050,977 B2
(45) Date of Patent: Nov. 1, 2011

(54) SUPPLY UNIT ORDERING SYSTEM, IMAGE FORMING APPARATUS, SUPPLY UNIT ORDERING METHOD AND SUPPLY UNIT ORDERING PROGRAM

(75) Inventor: Atsushi Kawai, Toyokawa (JP)

(73) Assignee: Konica Minolta Business Technologies, Inc, Tokyo (JP)

( * ) Notice: Subject to any disclaimer, the term of this patent is extended or adjusted under 35 U.S.C. 154(b) by 80 days.

(21) Appl. No.: 12/143,162

(22) Filed: Jun. 20, 2008

(65) Prior Publication Data

US 2008/0319877 A1    Dec. 25, 2008

(30) Foreign Application Priority Data

Jun. 21, 2007   (JP) ................................. 2007-163363

(51) Int. Cl.
*G06Q 30/00* (2006.01)
(52) U.S. Cl. ................... 705/26.1; 705/26.8; 705/26.81; 705/27.1; 705/26.2
(58) Field of Classification Search ............... 705/26, 705/27
See application file for complete search history.

(56) References Cited

U.S. PATENT DOCUMENTS

| | | | |
|---|---|---|---|
| 6,625,402 B2 | | 9/2003 | Takemoto |
| 7,124,097 B2* | | 10/2006 | Claremont et al. ......... 705/26.81 |
| 7,660,539 B2* | | 2/2010 | Tye et al. ....................... 399/24 |
| 2003/0040984 A1* | | 2/2003 | Inami et al. ................... 705/27 |
| 2004/0111326 A1* | | 6/2004 | Rock et al. .................... 705/26 |
| 2005/0137941 A1* | | 6/2005 | Fujinawa ....................... 705/26 |
| 2005/0192817 A1* | | 9/2005 | Sorenson et al. ............... 705/1 |
| 2008/0215454 A1* | | 9/2008 | Haines et al. .................. 705/26 |

FOREIGN PATENT DOCUMENTS

| | | |
|---|---|---|
| JP | 2001-228760 | 8/2001 |
| JP | 2001-331069 | 11/2001 |
| JP | 2003-195705 | 7/2003 |
| JP | 2004-086414 | 3/2004 |

OTHER PUBLICATIONS

HP Brochure printed Apr. 2001.*
Japanese Office Action mailed on Apr. 28, 2009 directed towards counterpart foreign application No. 2007-163363; 5 pages.

* cited by examiner

*Primary Examiner* — Jeffrey A Smith
*Assistant Examiner* — Courtney Stopp
(74) *Attorney, Agent, or Firm* — Morrison & Foerster LLP

(57) ABSTRACT

An image forming apparatus comprises: a readout portion that reads out from a memory of a supply unit that is replaceably loaded on the image forming apparatus itself, information about a plurality of vendors, which is stored in the memory; and a transmitter that transmits to a terminal apparatus the readout information about the vendors. And a terminal apparatus comprises: an obtainer that obtains information about the supply unit from respective servers owned by the vendors, by making access thereto according to the information about the vendors, which is received from the image forming apparatus; a display that displays on itself the obtained information; and an ordering portion that transmits an order for a supply unit to one of the servers, according to an order instruction issued by a user. After order transmission, information about a vendor owning the server that receives that order is stored in a storage.

8 Claims, 12 Drawing Sheets

~100

| Address | Page (Mode) | Title of Data | Default Data(8bits) | Memo |
|---|---|---|---|---|
| 00H | ROM | Model Identification | Model Identification Code | |
| 01H | | Color Identification | Color Identification Code | |
| 02H | | Not occupied | | |
| 03H | | Production Date | Production Date | |
| 04H | | | | |
| 05H | | Not occupied | FFH | |
| 06H | | Not occupied | FFH | |
| 07H | | Not occupied | FFH | |
| 08H | | Not occupied | FFH | |
| 09H | | Ship-to Code | Ship-to Code(1) | |
| 0AH | | | Ship-to Code(2) | |
| 0BH | | | Ship-to Code(3) | |
| 0CH | | Not occupied | | |
| 0DH | | | | |
| 0EH | | | | |
| 0FH | | | | |
| 10H | | | | |
| 11H | | | | |
| 12H | | Vendor Information1 | Vendor Name(Name of a vendor receiving order) | |
| 13H | | Vendor Information1 | URL Information | |
| 14H | | Vendor Information1 | Phone Number | |
| 15H | | Vendor Information2 | Vendor Name(Name of a vendor receiving order) | |
| 16H | | Vendor Information2 | URL Information | |
| 17H | | Vendor Information2 | Phone Number | |
| 18H | | Vendor Information3 | Vendor Name(Name of a vendor receiving order) | |
| 19H | | Vendor Information3 | URL Information | |
| 1AH | | Vendor Information3 | Phone Number | |
| 1BH | | Vendor Information4 | Vendor Name(Name of a vendor receiving order) | |
| 1CH | | Vendor Information4 | URL Information | |
| 1DH | | Vendor Information4 | Phone Number | |
| ⋮ | | ⋮ | ⋮ | |
| 2DH | | Vendor Information10 | Vendor Name(Name of a vendor receiving order) | |
| 2EH | | Vendor Information10 | URL Information | |
| 2FH | | Vendor Information10 | Phone Number | |
| 30H | R/W | Order Information1 | Vendor Name(Name of a vendor receiving order) | |
| 31H | | Order Information1 | Model Number | |
| 32H | | Order Information1 | Oder Date | |
| 33H | | Order Information2 | Vendor Name(Name of a vendor receiving order) | |
| 34H | | Order Information2 | Model Number | |
| 35H | | Order Information2 | Oder Date | |
| 36H | | Order Information3 | Vendor Name(Name of a vendor receiving order) | |
| 37H | | Order Information3 | Model Number | |
| 38H | | Order Information3 | Oder Date | |
| 39H~ 7FH | | Occupied for printer control | | |

FIG.4

| Address | Page (Mode) | Title of Data | Default Data (64bytes) | Memo |
|---|---|---|---|---|
| 00~11FH | | Occupied for printer control | | |
| 12H | | Vendor Priority Information1 | Vendor Name(Name of a vendor receiving order) | |
| 13H | | Vendor Priority Information2 | Vendor Name(Name of a vendor receiving order) | |
| 14H | | Vendor Priority Information3 | Vendor Name(Name of a vendor receiving order) | |
| 15H | | Vendor Priority Information4 | Vendor Name(Name of a vendor receiving order) | |
| 16H | | Vendor Priority Information5 | Vendor Name(Name of a vendor receiving order) | |
| 17H | | Vendor Priority Information6 | Vendor Name(Name of a vendor receiving order) | |
| 18H | | Vendor Priority Information7 | Vendor Name(Name of a vendor receiving order) | |
| 19H | | Vendor Priority Information8 | Vendor Name(Name of a vendor receiving order) | |
| 1AH | | Vendor Priority Information9 | Vendor Name(Name of a vendor receiving order) | |
| 1BH | | Vendor Priority Information10 | Vendor Name(Name of a vendor receiving order) | |
| 1CH | | Vendor Display Prohibit Information1 | Vendor Name(Name of a vendor receiving order) | |
| 1DH | R/W | Vendor Display Prohibit Information2 | Vendor Name(Name of a vendor receiving order) | |
| 1EH | | Vendor Display Prohibit Information3 | Vendor Name(Name of a vendor receiving order) | |
| 1FH | | Vendor Display Prohibit Information4 | Vendor Name(Name of a vendor receiving order) | |
| 20H | | Order Information1 | Vendor Name(Name of a vendor receiving order) | |
| 21H | | Order Information1 | Model Number | |
| 22H | | Order Information1 | Order Date | |
| 23H | | Order Information2 | Vendor Name(Name of a vendor receiving order) | |
| 24H | | Order Information2 | Model Number | |
| 25H | | Order Information2 | Order Date | |
| 26H | | Order Information3 | Vendor Name(Name of a vendor receiving order) | |
| 27H | | Order Information3 | Model Number | |
| 28H | | Order Information3 | Order Date | |
| 29H~7FH | | Occupied for printer control | | |

FIG.5

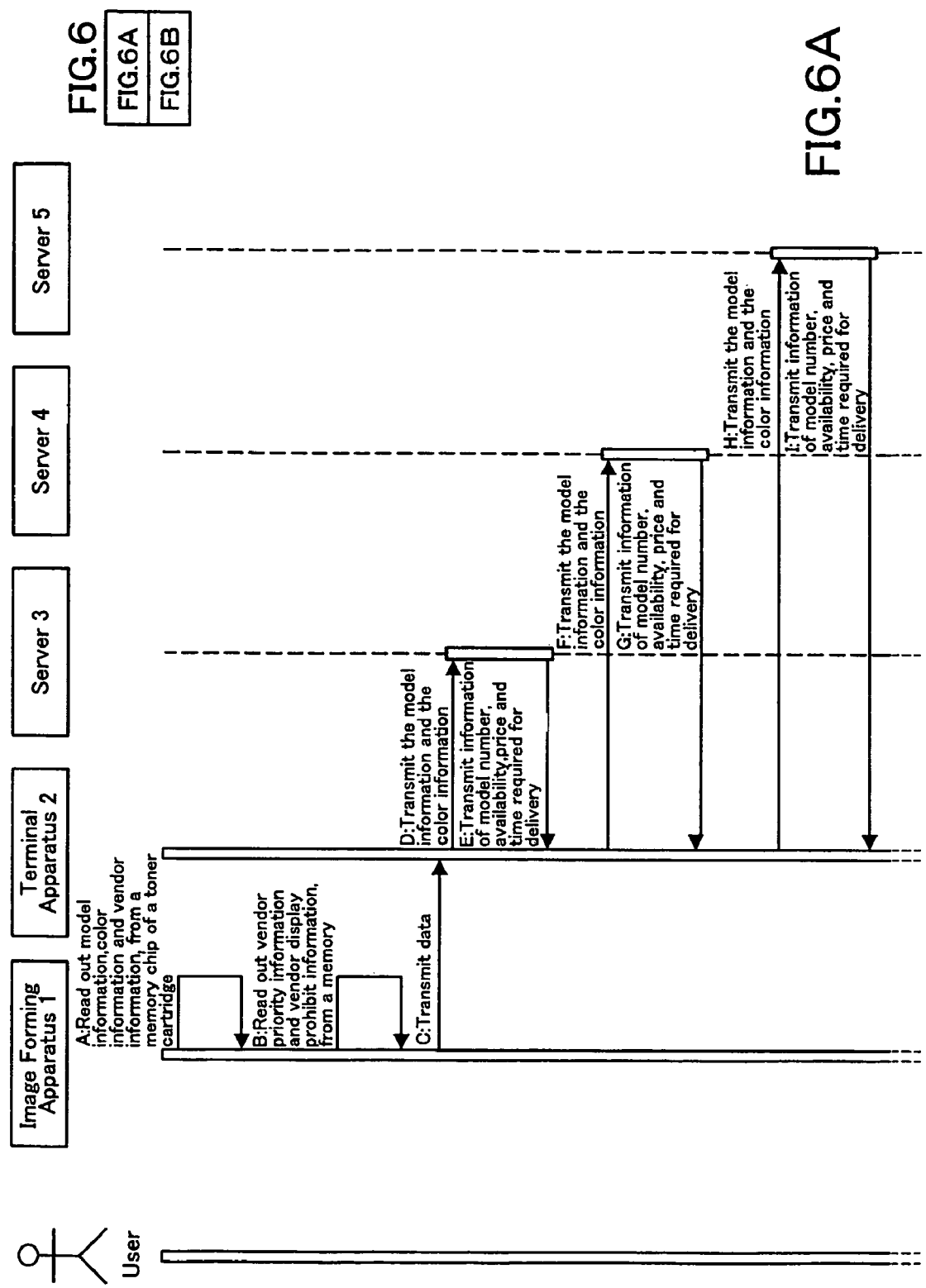

The Cyan toner cartridge is empty.
This toner cartridge can be replaced with the following products.

| | Model Number | Price | Availability | Time Required for Delivery | Phone Number |
|---|---|---|---|---|---|
| Vendor D | ○○△△ | ¥9,800 | Available | 1week | ○○○-□□-△△△△ |
| Vendor A | ■□□ □■□ □□□ | ¥9,500 | Available | 2weeks | △△△-○○-□□□□ |
| | ■■□ □□□ | ¥8,000 | Available | 2weeks | △△△-○○-□□□□ |
| Vendor B | △△○○ | ¥8,800 | Not available | - | □□-△△-○○○○ |

Click a model number to proceed to the order page.

FIG.10

SUPPLY UNIT ORDERING SYSTEM, IMAGE FORMING APPARATUS, SUPPLY UNIT ORDERING METHOD AND SUPPLY UNIT ORDERING PROGRAM

This application claims priority under 35 U.S.C. §119 to Japanese Patent Application No. 2007-163363 filed on Jun. 21, 2007, the entire disclosure of which is incorporated herein by reference in its entirety.

BACKGROUND OF THE INVENTION

1. Field of the Invention

The present invention relates to a supply unit ordering system that is capable of placing an order for a supply unit replaceably loaded on an image forming apparatus such as a copier, a printer or a MFP (Multi Function Peripheral) that is a multifunctional digital machine collectively having the copy and print functions, an image forming apparatus that is preferably used in the supply unit ordering system, a supply unit ordering method, and a supply unit ordering program.

2. Description of the Related Art

The following description sets forth the inventor's knowledge of related art and problems therein and should not be construed as an admission of knowledge in the prior art.

Such an image forming apparatus mentioned above uses supply units such as toner cartridges and imaging units. Each supply unit contains consumable portions such as toner consumed by operations repeatedly performed to print target data on a sheet or a photoconductive drum gradually deteriorated also due to repeated print operations. Each supply unit is replaced with a new one when its consumable portion runs out or reaches to the end of usefulness.

Some of the supply units used in an image forming apparatus are proper products provided from the manufacturer of the image forming apparatus, and the other supply units are un-proper products provided from what are called third party vendors other than that manufacturer.

Generally, supply units such as toner cartridges provided from third party vendors, have more possibilities of causing quality troubles and mismatch with image forming apparatuses, compared to proper products.

There is a heretofore known art that may work out the case above, and wherein if a un-proper supply unit is loaded on an image forming apparatus, a print operation is immediately prohibited (for example, this is described in Japanese Unexamined Laid-open Patent Publication No. 2003-195705).

However, supply units of good quality actually have few possibilities of causing a trouble during usage, even if those are un-proper products provided from third party vendors. For example, a supply unit has few possibilities of causing a trouble during usage, if it is provided from a third party vendor which product quality is guaranteed by the manufacturer of the image forming apparatus. Further, it would be advantageous if un-proper supply units provided from third party vendors become freely used, since users have more product choices.

There is another heretofore known art, and wherein: when a supply unit is on a distribution channel after shipment, information about a vendor providing the supply unit and other information are written in a memory loaded thereon; if the supply unit is inserted in an image forming apparatus, the image forming apparatus reads out the information about the vendor from the memory; and if the image forming apparatus detects that the time for replacing the supply unit is coming near, the information about the vendor is displayed on a display of the image forming apparatus or displayed on a display that is connected to the image forming apparatus. Thus, it is advantageous that users can place an order for a supply unit, easily (for example, this is described in Japanese Unexamined Laid-open Patent Publication No. 2001-331069).

However, with the art disclosed in Japanese Unexamined Laid-open Patent Publication No. 2001-331069, information about only one vendor is written in the memory loaded on the supply unit. Therefore, a user using the image forming apparatus has no other vendor choice to place an order for a supply unit with, and cannot select a preferable one among supply units provided from a plurality of vendors. In other words, it is disadvantageous that users cannot arbitrarily select and purchase a preferable one among un-proper supply unit of good quality.

Further, with the art disclosed in the publication above, once information about a vendor is written in the memory, can never be re-written. Therefore, the latest information of price, availability and etc. of supply units are not always provided to users. In other words, it is disadvantageous that users reluctantly have to place an order for a supply unit based on old information, and thereby suffer from the gap in price, availability and etc.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an objective of the present invention to provide a supply unit ordering system that enables users to select a preferable vendor providing supply units; obtain the latest information about supply units; and place an order for a supply unit based on the obtained latest information, when a supply unit is replaced with a new one or when another need arises.

It is another objective of the present invention to provide an image forming apparatus that is preferably used in the supply unit ordering system.

It is yet another objective of the present invention to provide a supply unit ordering method that enables users to select a preferable vendor providing supply units; obtain the latest information about supply units; and place an order for a supply unit based on the obtained latest information, when a supply unit is replaced with a new one or when another need arises.

It is still yet another objective of the present invention to provide a supply unit ordering program stored in a computer readable recording medium to make a computer of the image forming apparatus execute a process to place an order for a supply unit.

According to a first aspect of the present invention, a supply unit ordering system comprises:

an image forming apparatus comprising:

a readout portion that reads out from a memory of a supply unit that is replaceably loaded on the image forming apparatus itself, information about a plurality of vendors providing the supply unit, which is stored in the memory; and a transmitter that transmits to a terminal apparatus, the readout information about the vendors;

a terminal apparatus comprising:

an obtainer that obtains information about the supply unit from respective servers owned by the vendors, by making access to the respective severs according to the information about the vendors, which is received from the image forming apparatus;

a display that displays on itself, the obtained information about the supply unit; and an ordering portion that transmits an order for a supply unit to one of the servers, according to an order instruction issued by a user; and a storage that stores in itself, information about a vendor that owns the server receiving that order transmitted by the ordering portion.

According to a second aspect of the present invention, an image forming apparatus comprises:

a readout portion that reads out from a memory of a supply unit that is replaceably loaded on the image forming apparatus itself, information about a plurality of vendors providing the supply unit, which is stored in the memory;

an obtainer that obtains information about the supply unit from respective servers owned by the vendors, by making access to the respective severs according to the readout information about the vendors;

a display that displays on itself, the obtained information about the supply unit;

an ordering portion that transmits an order for a supply unit to one of the servers, according to an order instruction issued by a user; and an instructor that gives an instruction to store in a storage, information about a vendor that owns the server receiving that order transmitted by the ordering portion.

According to a third aspect of the present invention, a supply unit ordering method comprises:

reading out from a memory of a supply unit that is replaceably loaded on an image forming apparatus, information about a plurality of vendors providing the supply unit, which is stored in the memory;

obtaining information about the supply unit from respective servers owned by the vendors, by making access to the respective servers according to the readout information about the vendors;

displaying on a display, the obtained information about the supply unit;

transmitting an order for a supply unit to one of the servers, according to an order instruction issued by a user; and giving an instruction to store in a storage, information about a vendor that owns the server receiving that order.

According to a fourth aspect of the present invention, a supply unit ordering program is stored in a computer readable recording medium to make a computer of an image forming apparatus execute:

reading out from a memory of a supply unit that is replaceably loaded on the image forming apparatus, information about a plurality of vendors providing the supply unit, which is stored in the memory;

obtaining information about the supply unit from respective servers owned by the vendors, by making access to the respective servers according to the readout information about the vendors;

displaying on a display, the obtained information about the supply unit;

transmitting an order for a supply unit to one of the servers, according to a user instruction issued by a user; and storing in a storage, information about a vendor that owns the server receiving that order.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a view to explain information written in a memory chip of a toner cartridge;

FIG. 5 is a view to explain information stored in a memory of the image forming apparatus;

FIG. 10 is a flowchart showing a procedure executed in the terminal apparatus.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Embodiment—1

Figure 1:
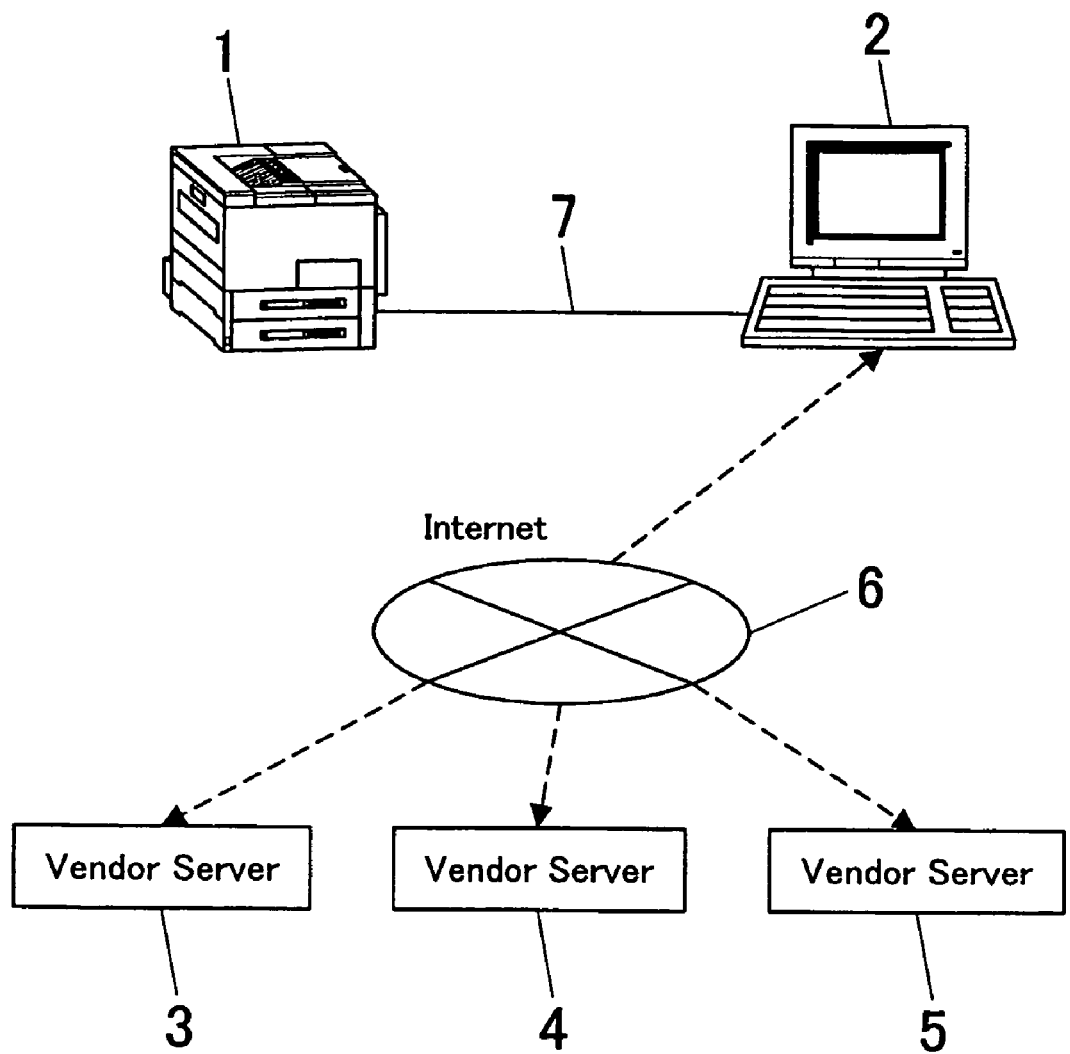
FIG. 1 is a view showing a configuration of the entire supply unit ordering system.

FIG. 1 is a view showing a configuration of a supply unit ordering system according to the first embodiment of the present invention.

As shown in FIG. 1, the supply unit ordering system comprises an image forming apparatus 1 such as a MFP that is a multifunctional digital machine, and a terminal apparatus 2 that is a personal computer (hereinafter will be referred to as "PC"). The image forming apparatus 1 and the terminal apparatus 2 are interconnected via a network 7 that is a LAN (Local Area Network) or directly interconnected by a communication line, in order to exchange data with each other. And the terminal apparatus 2 is interconnected to vendor servers 3, 4 and 5 owned by vendors of supply units, via an internet 6.

Figure 2:
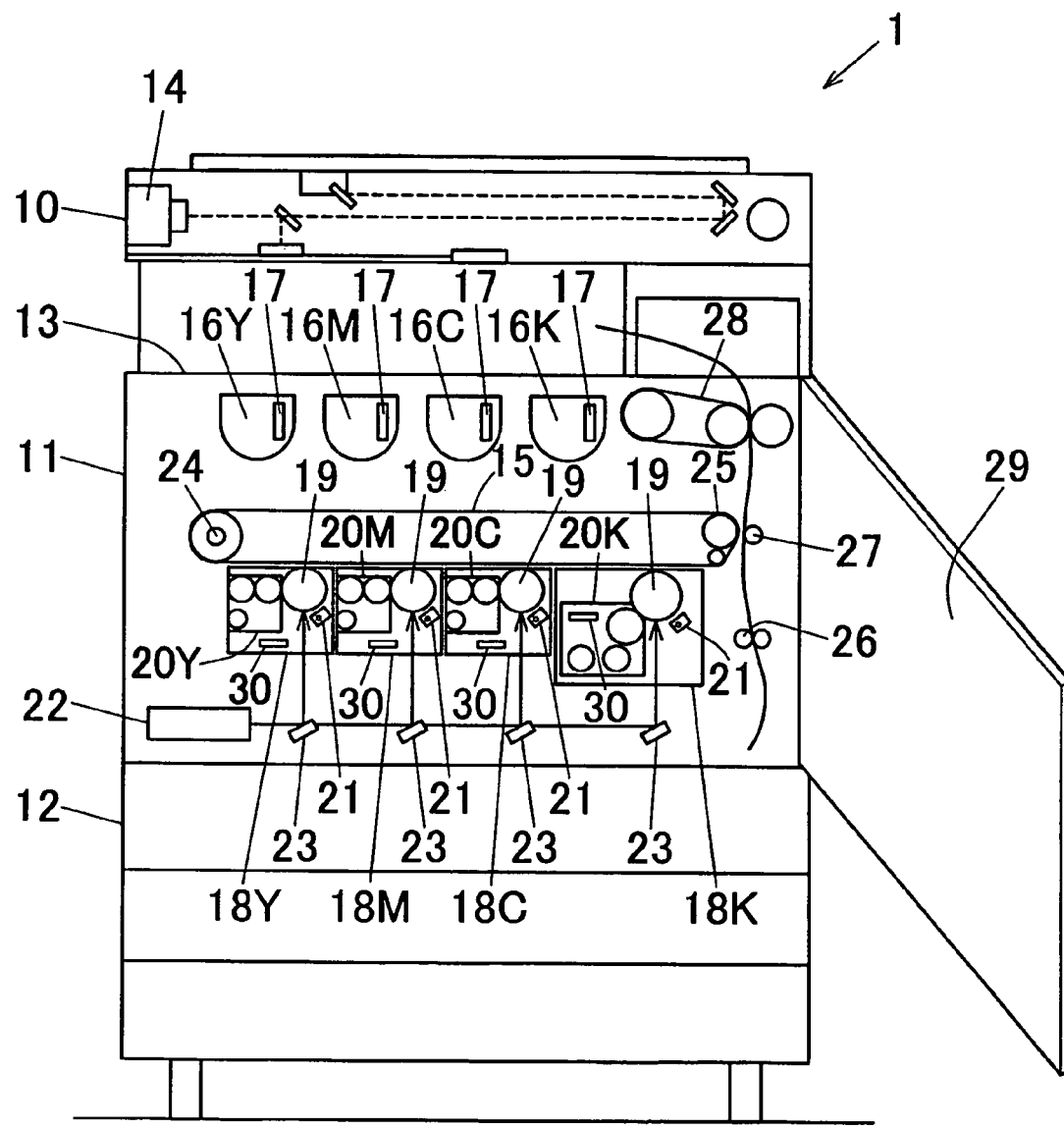
FIG. 2 is a view showing a configuration of an image forming apparatus that is used in the system of FIG. 1.

FIG. 2 is a view showing a configuration of the image forming apparatus 1.

As shown in FIG. 2, the image forming apparatus 1 comprises a scanner 10, an image former 11, a sheet feeder 12, a discharge tray 13 and etc.

The scanner 10 comprises a CCD sensor 14, and reads a document placed on an automatic document feeder or a platen glass (these are not shown in Figures).

The image former 11 prints on a sheet, image data read out from a document by the scanner 10, print data transmitted from an external apparatus and other data. To realize this print operation, the image former 11 comprises imaging units 18Y, 18M, 18C and 18K, toner cartridges 16Y, 16M, 16C and 16K, an intermediate transfer belt 15, an exposure portion 22, polygon mirrors 23, a conveyer roller 26, a second transfer roller 27, a fixer 28 and etc., in this embodiment.

The imaging units 18Y, 18M, 18C and 18K form a toner image by actualizing an electrostatic latent image by using toner, and are provided to express Yellow (Y), Magenta (M), Cyan (C) and Black (K), respectively. Each of the imaging units is one unit collectively having a photoconductive drum 19 that is revolvable, a charger 21 that charges the photoconductive drum 19, a developer 20Y, 20M, 20C or 20K that develops a toner image by transferring toner to an electrostatic latent image formed on the surface of the photoconductive drum 19, and other portions.

The photoconductive drum 19 and others included in the imaging units 18Y, 18M, 18C and 18K are consumable portions that are gradually deteriorated due to repeated print operations and eventually reach to the end of usefulness. Therefore, the imaging units 18Y, 18M, 18C and 18K are supply units that are replaced with new ones when their consumable portions reach to the end of usefulness. The imaging units are replaceably loaded on the image forming apparatus 1, and a front door 29 thereof can be opened for replacement. Further, the imaging units 18Y, 18M, 18C and 18K load a memory chip 30 in their selves and they record in the memory 30 information about the imaging unit 18Y, 18M, 18C and 18K, respectively.

The toner cartridges 16Y, 16M, 16C and 16K contain toner to express Yellow (Y), Magenta (M), Cyan (C) and Black (K) and supply that toner to the imaging unit 16Y, 16M, 16C and 16K, respectively.

The toner contained in the toner cartridges 16Y, 16M, 16C and 16K is also consumable portion that is consumed due to repeated print operations. Therefore, the toner cartridges 16Y, 16M, 16C and 16K are supply units that are replaced with new ones when toner runs out. The toner cartridges are replaceably loaded on the image forming apparatus 1, and the front door 29 thereof can be opened for replacement. Further, the toner cartridges 16Y, 16M, 16C and 16K load a memory chip 17 in their selves and record in the memory chip 17 information about toner cartridge 16Y, 16M, 16C and 16K, respectively. Detailed explanation will be provided later.

In the first transfer step, the intermediate transfer belt 15 obtains layers of toner images that are formed on the surface of the photoconductive drum 19 of the imaging units 18Y, 18M, 18C and 18K, respectively. The intermediate transfer belt 15 is hung over a driving roller 24 and a driven roller 25, and is driven in cycles in a determined direction.

The exposure portion 22 forms an electrostatic latent image on the surface of the photoconductive drum 19 by irradiating with a laser light the charged photoconductive drum 19 of the imaging units 18Y, 18M, 18C and 18K.

The polygon mirrors 23 deflect the laser light irradiated by the exposure portion 22 to make it scan the surface of the photoconductive drum 19.

The conveyer roller 26 conveys to the second transfer position, a sheet fed by the sheet feeder 12. The second transfer roller 27 transfers the toner images transferred to the intermediate transfer belt 15 in the first transfer step, to the sheet conveyed by the conveyer roller 26. The fixer 28 properly fixes the toner images transferred to the sheet.

The sheet feeder 12 holds in itself, sheets organized by types. When a print instruction is issued, the sheet feeder 12 provides sheets one by one, then the conveyer roller 26 conveys the sheets to the second transfer position.

The discharge tray 13 receives the sheets carrying the toner images fixed by the fixer 28 thereon, which are discharged to outside.

Figure 3:
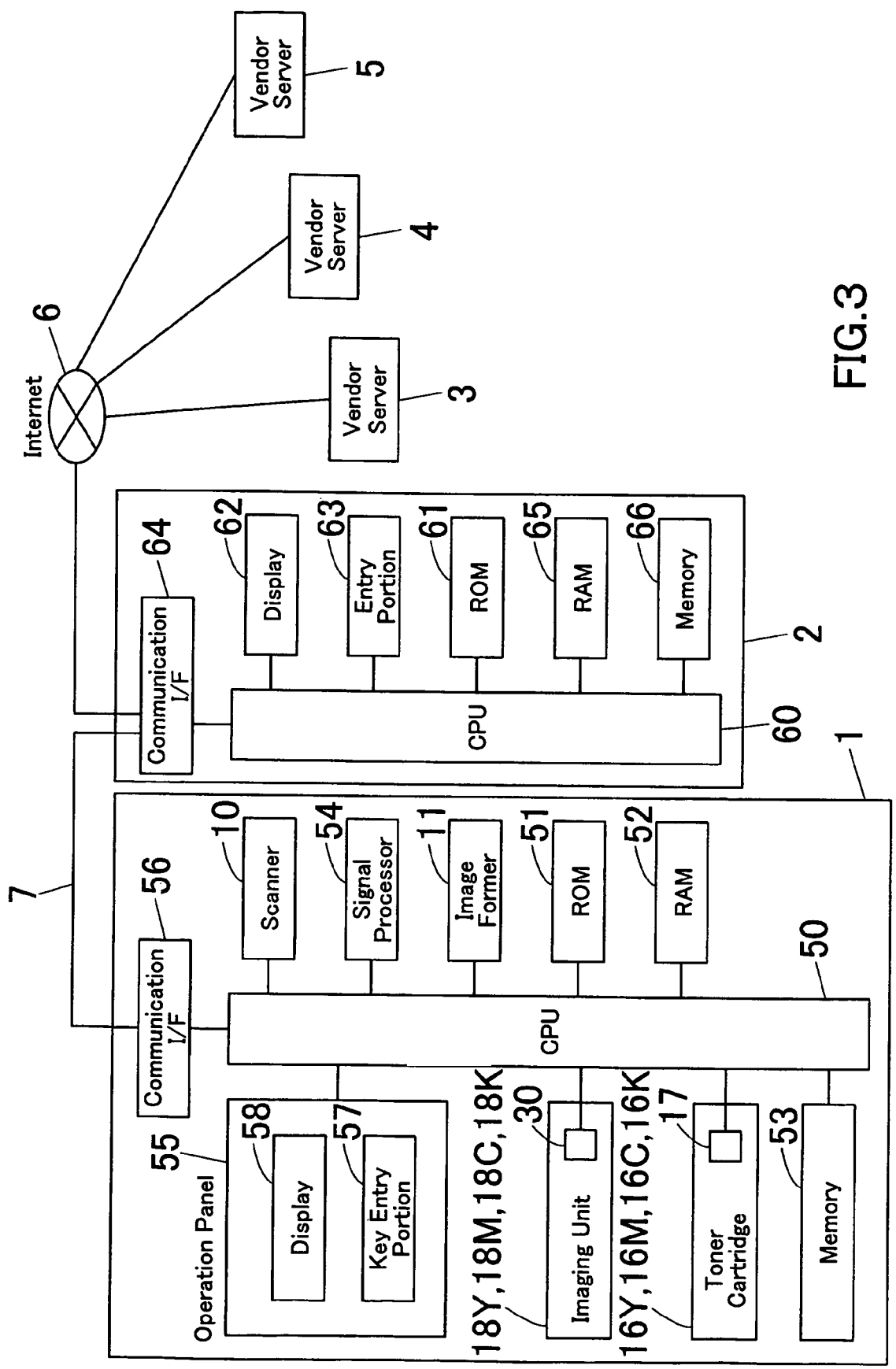
FIG. 3 is a view showing an electrical configuration of the image forming apparatus and a terminal apparatus that are used in the system of FIG. 1.

FIG. 3 is a block diagram showing an electrical configuration of the image forming apparatus 1 and the terminal apparatus 2.

As shown in FIG. 3, the image forming apparatus 1 comprises a scanner 10, an image former 11, toner cartridges 16Y, 16M, 16C and 16K, imaging units 18Y, 18M, 18C and 18K, a CPU 50, a ROM 51, a RAM 52, a memory 53, a signal processor 54, an operation panel 55, a communication interface (I/F) 56 and etc. Since the scanner 10, the image former 11, the toner cartridges 16Y, 16M, 16C and 16K, and the imaging units 18Y, 18M, 18C and 18K are already explained above, another explanation is omitted.

The CPU 50 centrally controls the entire image forming apparatus 1 by executing an operation program stored in the ROM 51. In this embodiment, for example, life information indicating the occurrence of toner empty of the toner cartridge 16Y, 16M, 16C or 16K and the end of usefulness of the imaging unit 18Y, 18M, 18C or 18K is detected, and thereby the supply unit is replaced with a new one, information about vendors manufacturing or distributing supply units (hereinafter will be also referred to simply as "vendor information"), which is stored in the memory chip 17 of the toner cartridge or the memory chip 30 of the imaging unit, is read out therefrom, and vendor priority information stored in the memory 53 is also read out therefrom. Further, consolidated data is created based on the readout information then transmitted to the terminal apparatus 2. Detailed explanation will be provided later.

The ROM 51 stores in itself a program executed by the CPU 50 and other data.

The RAM 52 functions as an operation area for the CPU 50 to execute a program, and temporarily stores in itself a program, data used when a program is executed, and other data.

The memory 53 is a recording medium such as a hard disk drive, and stores in itself image data read out from a document by the scanner 10, various programs and other data. In this embodiment, the memory 53 preliminarily stores in itself, vendor priority information indicating the listing order of information about supply units (hereinafter will be referred to as "product data") displayed on the terminal apparatus 2, which is obtained from the vendor servers 3, 4 and 5, and also stores display prohibit information indicating vendors that is set as the display prohibit vendor, as will be described later. Further, when an order is placed for a supply unit, order information indicating a vendor name, a model number, an order date and etc. is stored therein. Further, in this embodiment, when an order is placed for a supply unit, order information is also stored in the memory chip 17 or 30 of the ordered supply unit (a toner cartridge or an imaging unit). All of a vendor name, a model name and an order date are not necessarily stored, and only a vendor name may be stored as order information.

The signal processor 54 processes inputted image data by converting signals in a predetermined manner.

The operation panel 55 displays on itself various messages and etc., and is used by users to perform various entries. And it comprises a key entry portion 57, a display 58 and etc.

The key entry portion 57 comprises a plurality of keys such as numeric keys and a start key, and is used by users to issue an instruction to the image forming apparatus 1. The display 58 shows users various screens, messages and etc., and comprises a crystal liquid touch panel and etc.

The communication interface (I/F) 56 functions as a communicator that exchanges data with the terminal apparatus 2 via the network 7 or etc.

The terminal apparatus 2 comprises a CPU 60, a ROM 61, a display 62, an entry portion 63, a communication interface (I/F) 64, a RAM 65, a memory 66 and etc.

The CPU 60 centrally controls the entire terminal apparatus 2 by executing a program stored in the ROM 61. In this embodiment, the CPU 60 makes access to the vendor servers 3, 4 and 5 according to the consolidated data received from the image forming apparatus 1 and obtains product data of supply units from the respective vendor servers; displays the obtained product data on the display 62; and places an order for a supply unit according to a user instruction. Detailed explanation will be provided later.

The ROM 61 stores in itself a program executed by the CPU 60 and other data.

The display 62 displays on itself various screens and messages for a user. In this embodiment, the display 62 displays on itself a product selection screen showing information including product data of supply units, which is obtained from the vendor servers 3, 4 and 5.

The entry portion 63 comprises a keyboard, a mouse and etc., and is used by users to issue an instruction to the terminal apparatus 2.

The communication interface (I/F) 64 functions as a communicator that exchanges data with the image forming apparatus 1, the vendor servers 3, 4 and 5, and other apparatuses. via the network 7, the internet 6 or etc.

The RAM 65 functions an operation area for the CPU 60 to execute a program, and temporarily stores in itself a program, data used when a program is executed, and other data.

The memory 66 is a recording medium such as a hard disk drive, and stores in itself data received from the image forming apparatus 1, product data obtained from the vendor servers 3, 4 and 5, and other data.

The vendor server 3, 4 and 5 are personal computers or etc., and stores in themselves, product data such as model names (specification), prices, availability, time required for delivery and etc., as information about supply units provided from the respective vendors. When the terminal apparatus 2 transmits a request for their product data via the internet 6, the vendor servers send back their product data to the terminal apparatus 2. And when the terminal apparatus 2 transmits an order for a supply unit, the vendor servers send back an order confirmation.

Hereinafter, address mapping for the memory chip 17 loaded on the toner cartridges 16Y, 16M, 16C and 16K mentioned above, will be explained with reference to FIG. 4.

The memory chip 17 has two different kinds of recording area, which are the addresses 00H through 2FH of recording area and the addresses 30H through 7FH of recording area. Each address can hold information up to 8 bits.

Once data is written into the addresses 00H through 2FH of recording area during the production process, no more data is permitted to be written therein after that. That is, the recording area is only readable (it is a ROM area).

In this recording area, a model identification code indicating the type of the toner cartridge, a color identification code indicating the color of toner filled in the toner cartridge, a production date of the toner cartridge, a ship-to code indicating a destination country or region, vendor information of a plurality of vendors, and other information are stored.

The vendor information consists of vendor names, URL (Uniform Resource Locator) information and phone numbers of vendors providing toner cartridges.

The addresses 30H through 7FH of recording area is repeatedly rewritable (it is a R/W area).

When an order is placed for a toner cartridge according to a user instruction, order information including a vendor name of the vendor with which an order is placed, a model number of the ordered toner cartridge and an order date, as previously mentioned, is stored in the addresses 30H through 7FH of recording area.

The addresses 39H through 7FH of recording area is occupied for printer control, and information for controlling the image forming apparatus 1 is written therein.

Since address mapping for the memory chip 30 of the toner cartridges 18Y, 18M, 18C and 18K is the same as that of the memory chip 17 of the toner cartridges, explanation thereof is omitted here.

FIG. 5 shows address mapping for a recording area of the memory 53 loaded on the image forming apparatus 1, in which vendor priority information, vendor display prohibit information and order information about an ordered supply unit are stored. This entire recording area is repeatedly rewritable (it is a R/W area).

The addresses 00H through 11FH and the addresses 29H through 7FH of recording area are occupied for printer control.

In the addresses 12H through 1BH of recording area, vendor priority information indicating the listing order of product data displayed on a display, which is obtained from the vendor servers 3, 4 and 5, is stored. Concretely, product data obtained from a vendor server owned by a vendor that is set as the vendor priority 1, is displayed in the list highly than product data obtained from a vendor server owned by a vendor that is set as the vendor priority 2.

In the addresses 1CH through 1FH of recording area, vendor display prohibit information indicating vendors which product data is prohibited from being displayed on a display, is stored. The vendor servers 3, 4 or 5 owned by a vendor indicated by the vendor display prohibit information cannot be accessed. Therefore, product data thereof is not displayed on a display.

In the addresses 20H through 28H of recording area, order information including a vendor name of a vendor with which an order is placed, a model number of an ordered toner cartridge and an order date is stored, when an order is placed according to a user instruction.

Vendor priority information and vendor display prohibit information are not written therein before shipping the image forming apparatus 1, but written by a support engineer and remotely rewritten by the manufacturer of the image forming apparatus 1, after shipping.

Figure 6B:
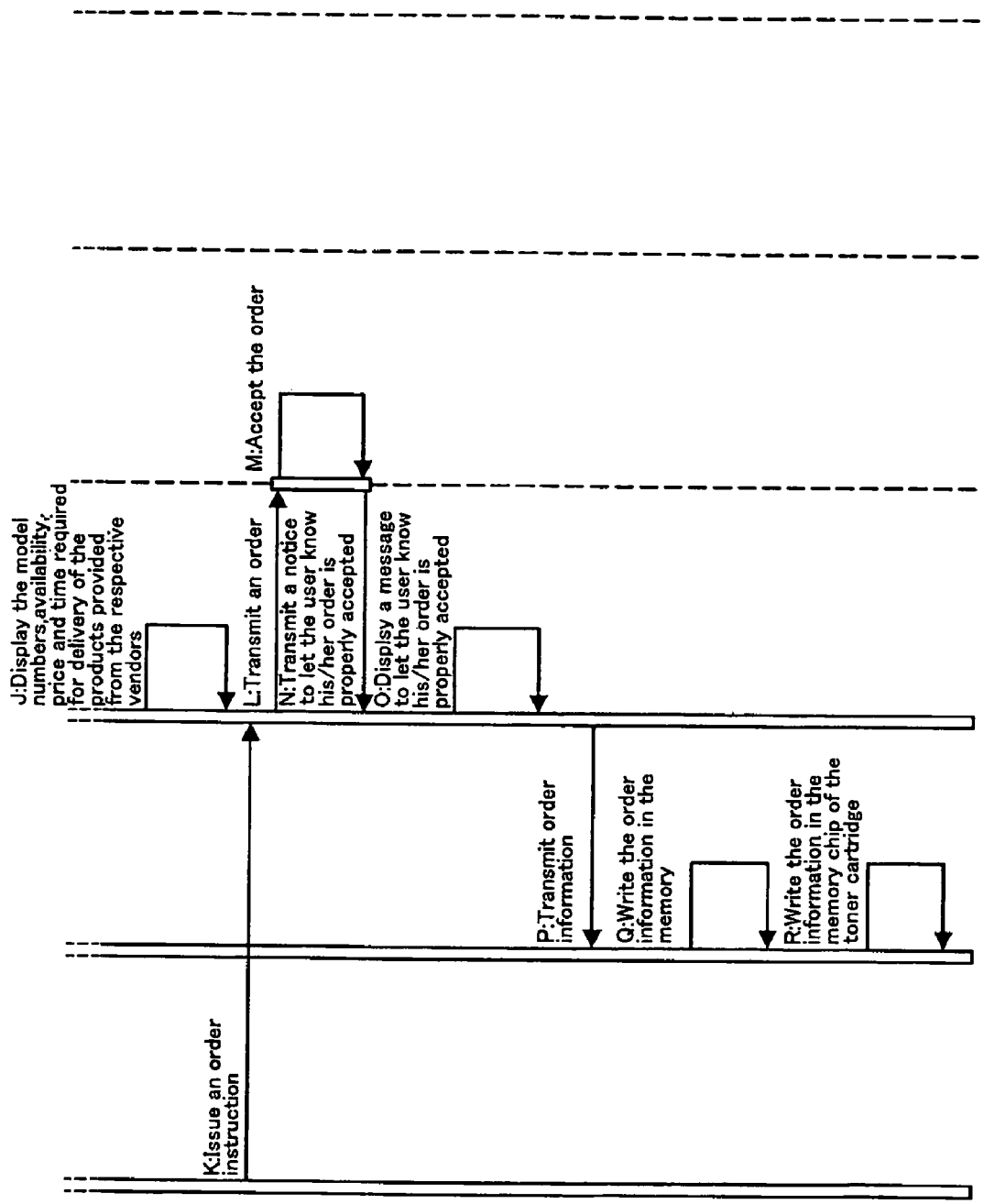
FIG. 6 is a view showing operations cooperatively performed by a user, the image forming apparatus, the terminal apparatus and vendor servers, and wherein toner empty occurs; an order is placed for a toner cartridge; and order information is written both in the memory chip and a memory of the image forming apparatus.

Hereinafter, operations cooperatively performed by a user, the image forming apparatus 1, the terminal apparatus 2 and the vendor servers 3, 4 and 5, will be explained with reference to FIG. 6, and wherein toner empty is occurred to the toner cartridge 16Y, 16M, 16C or 16K, and an order for a toner cartridge is placed, and then order information is written in the memory chip 17 of the toner cartridge 16Y, 16M, 16C or 16K that is out its toner, and also in the memory 53 of the image forming apparatus 1.

When toner empty is occurred to the toner cartridge 16Y, 16M, 16C or 16K, and the CPU 50 detects the occurrence of toner empty, operations are performed according to the following steps A to R. Since the art for detecting toner empty is heretofore known, its explanation is omitted.

A: Model information, color information and vendor information are read out from the memory chip 17 of a toner cartridge that is out of toner.

B: The image forming apparatus 1 reads out vendor priority information and vendor display prohibit information are read out from the memory 53 thereof.

C: The image forming apparatus 1 creates consolidated data based on the readout information, then transmitted to the terminal apparatus 2.

D: The terminal apparatus 2 transmits the model information and the color information to the vendor server 3 that is one of the vendor servers, via the internet 6, according to the vendor information written in the consolidated data that is received from the image forming apparatus 1.

E: The vendor server 3 receiving the model information and the color information transmits to the terminal apparatus 2, product data (a model number, a availability, a price and a time required for delivery) of a toner cartridge meeting those received information.

F: The terminal apparatus 2 further transmits the model information and the color information to the vendor server 4, via the internet 6, according to the vendor information written in the consolidated data.

G: The vendor server 4 receiving the model information and the color information transmits to the terminal apparatus 2, product data of a toner cartridge meeting those received information.

H: The terminal apparatus 2 further transmits the model information and the color information to the vendor server 5, via the internet 6, according to the vendor information written in the consolidated data.

I: The vendor server 5 receiving the model information and the color information transmits to the terminal apparatus 2, product data of a toner cartridge meeting those received information.

J: When data communication is completed with all of the vendor servers written in the consolidated data that is received from the image forming apparatus 1, the received product data of the respective toner cartridges are displayed on the display 62 of the terminal apparatus 2, and the terminal apparatus 2 waits until a user issues an order instruction.

K: A user selects a preferable toner cartridge, and issues an order instruction.

L: If the user selects a toner cartridge provided from a vendor owning the vendor server 3 for example, the terminal apparatus 2 transmits an order to the vendor server 3.

M: The vendor server 3 accepts that order.

N: The vendor server 3 transmits to the terminal apparatus 2, a notice to let the user know the user's order is properly accepted.

O: The terminal apparatus 2 displays a message on the display 62 to let the user know this user's order is properly accepted.

P: The terminal apparatus 2 transmits to the image forming apparatus 1, order information including a vendor name, an order date and a model number.

Q: The image forming apparatus 1 writes that order information in the memory 53 thereof.

R: The image forming apparatus 1 writes that order information in the memory chip 17 of the toner cartridge 16Y, 16M, 16C or 16K that is to be replaced.

[Operations of the Image Forming Apparatus 1]

Hereinafter, a procedure executed in the image forming apparatus 1, which is just one portion of the operations of the entire system shown in FIG. 6, will be explained with reference to a flowchart shown in FIG. 7. This procedure is executed by the CPU 50 according to an operation program stored in a recording medium such as the ROM 51.

The occurrence of toner empty is detected (Step S10), then vendor information, model information and color information are read out from the memory chip 17 of the toner cartridge 16Y, 16M, 16C or 16K that is out of toner (Step S11).

Figure 8:
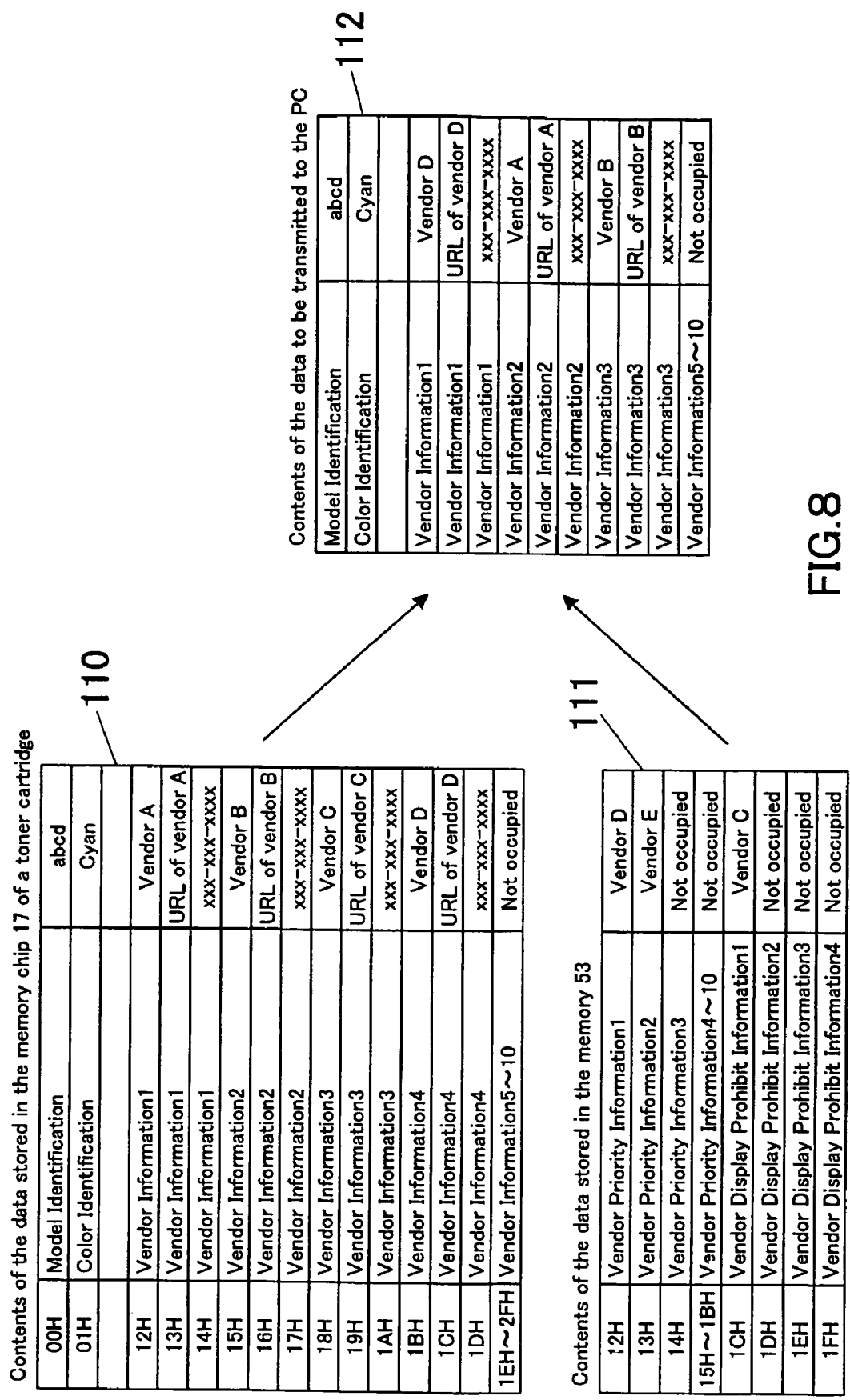
FIG. 8 is a view to explain how to create consolidated data.

Subsequently, vendor priority information and vendor display prohibit information are read out from the memory 53 (Step S12), and consolidated data 112 is created based on the information read out from the memory chip 17 and the memory 53, as shown in FIG. 8 (Step S13). Then the consolidated data 112 is transmitted to the terminal apparatus 2 (Step S14).

And it is judged whether or not order information that is transmitted from the terminal apparatus 2 after placing an order, is received therefrom (Step S15). If it is not received (NO in Step S15), the routine waits until it is received. If it is received (YES in Step S15), the received order information is written in the memory 53 and also in the memory chip 17 of the toner cartridge that is out of toner, in Step S16.

Figure 7:
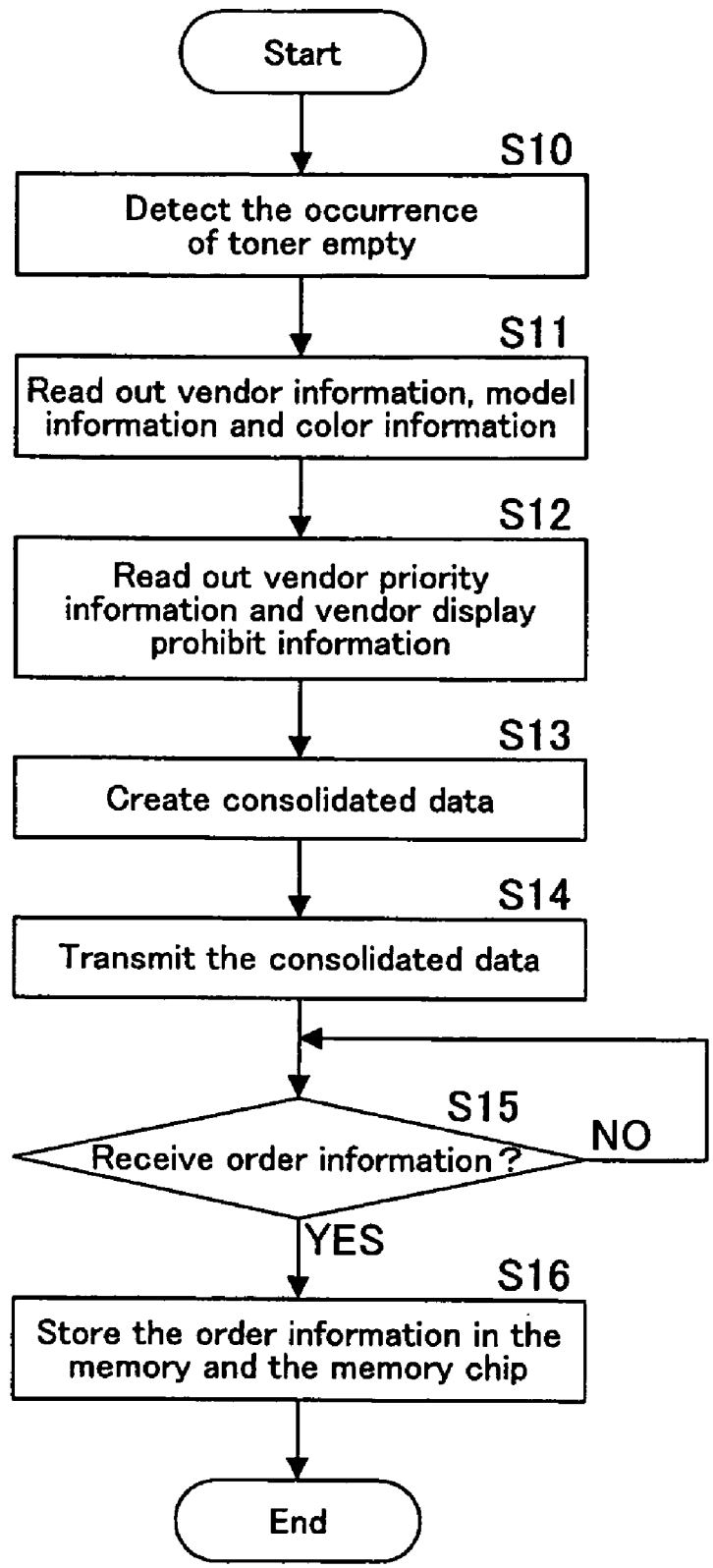
FIG. 7 is a flowchart showing a procedure executed in the image forming apparatus.

FIG. 8 is a view to explain how to create the consolidated data 112 in Step S13 of FIG. 7.

As shown in FIG. 8, information read out from the memory chip 17 is indicated by the number 110, and information read out from the memory 53 is indicated by the number 111. The consolidated data 112 is created in the following manner.

Since Vendor D is written as the first priority vendor in the information 111 read out from the memory 53, the vendor information of Vendor D is put in the first positions in the consolidated data 112. Meanwhile, although Vendor E is even written as the second priority vendor therein, data of Vendor E is not put in the consolidated data 112 because there is no vendor information of Vendor E, written in the information 110 read out from the memory chip 17. In this example shown in FIG. 8, since there is no vendor priority information of any other vendor than Vendor D and Vendor E, written in the information 111 read out form the memory 53, vendor information of the vendors other than Vendor D are put in the consolidated data 112, according to the mapping order of the vendor information written in the information 110 that is read out from the memory chip 17.

Since vendor information of Vendor A and Vendor B are written in the alphabetical order in the information 110 read out from the memory chip 17, the vendor information of Vendor A and Vendor B are put according to this same order, in the consolidated data 112. Meanwhile, data of Vendor C is not put in the consolidated data 112 because Vendor C is written as the display prohibit vendor in the information 111 read out from the memory 53.

[Operations of the Terminal Apparatus 2]

Figure 9:
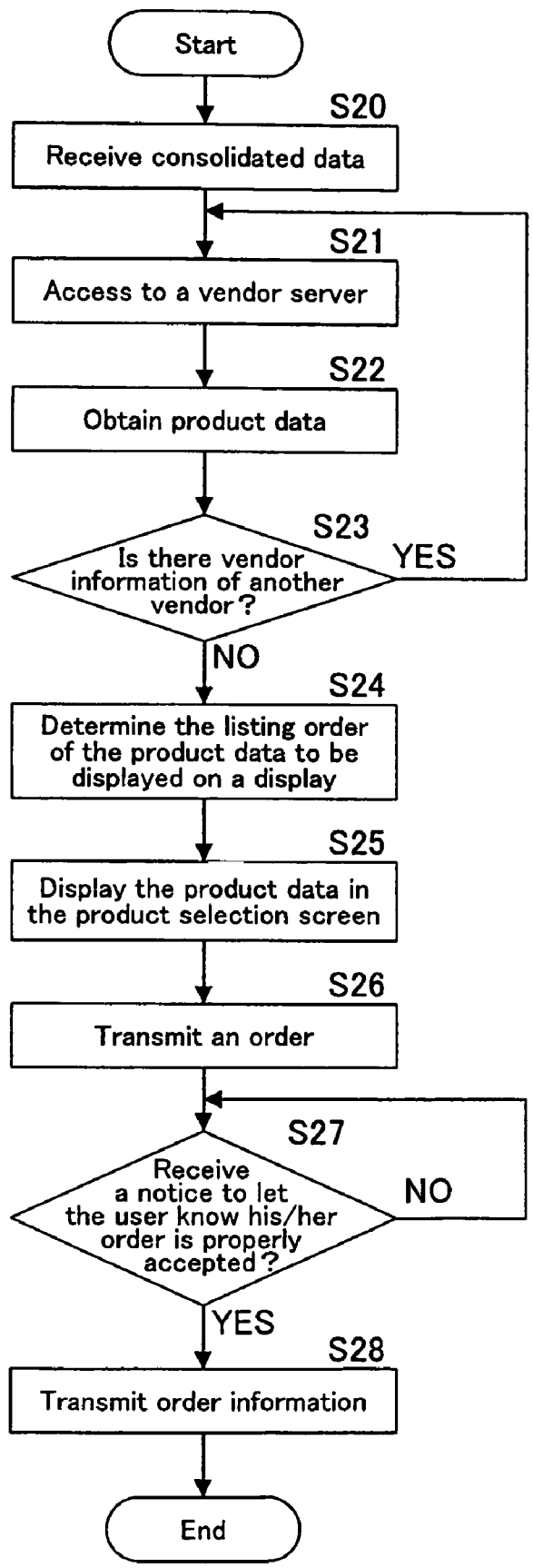
FIG. 9 is a view showing an example of a product selection screen.

Hereinafter, a procedure executed in the terminal apparatus 2 receiving the consolidated data, will be explained with reference to a flowchart shown in FIG. 9. This procedure is executed by the CPU 60 of the terminal apparatus 2 according to an operation program stored in a recording medium such as the ROM 61.

The consolidated data 112 is received from the image forming apparatus 1 (Step S20). Then, an access to the vendor server 3 owned by one of the vendors included in the consolidated data 112, is made according to the vendor information thereof (Step S21), and product data (a model number, a price, a availability, a time required for delivery and etc.) matching those of a toner cartridge to be replaced, is obtained from the vendor server 3 (Step S22). Subsequently, it is judged whether or not there is vendor information of another vendor in the consolidated data 112 (Step S23). If there is data of another vendor (YES in Step S23), the routine returns to Step S21, and wherein an access to the vendor server 4 owned by that vendor is made according to the vendor information (Step S21) and product data is obtained (Step S22). The routine repeats Steps S21 through S23 until there is no data of another vendor.

If there is no data of another vendor (NO in Step S23), the listing order of the product data to be displayed on a display, which are obtained from the respective vendor servers, is determined based on the consolidated data 112 (Step S24), and a product selection screen 120 including the product data is displayed on the display 62.

FIG. 10 is a view showing an example of the product selection screen 120 that is displayed when toner empty occurs to the Cyan toner cartridge 16C. As understood from this screen, the listing order of product data displayed therein corresponds to the mapping order of vendor information written in the consolidated data 112. Concretely, since the vendor information of Vendor D, Vendor A and Vendor B are written in this order in the consolidated data 112, product data of the respective vendors, which is model numbers, prices, availability, time required for delivery and etc., are listed also Vendor D, Vendor A and Vendor B, in this order from the top, in the product selection screen 120.

Then, a user selects a preferable vendor and issues an instruction to place an order for a toner cartridge via the product selection screen 120, and the terminal apparatus 2 transmits that order to the vendor server 3, 4 or 5 owned by the selected vendor (Step S26). And the routine waits until a notice to let the user know that the order is properly accepted, is received from the vendor server (Step S27). If such a notice is received (YES in Step S27), order information is transmitted to the image forming apparatus 1 in Step S28.

As described above in this embodiment, vendor information of a plurality of vendors is preliminarily stored in the memory chip 17 of a toner cartridge, and product data matching the toner cartridge are obtained by making access to respective servers owned by the plurality of vendors according to the vendor information, and then the product data are displayed on the display 62 of the terminal apparatus 2. And a user can select a preferable toner cartridge based on the product data of products provided from the plurality of vendors, which are displayed on the display 62, and issue an order instruction. In this way, this embodiment would bring more choices of toner cartridges.

If the vendor information of the plurality vendors, which is stored in the memory chip 17 of the toner cartridge, includes that of a third party vendor which product quality guaranteed by the manufacturer of the image forming apparatus 1, users can arbitrarily select a preferable product in pure consideration of price and etc., regardless of whether or not it is proper. As a matter of course, all of the plurality of vendors can be third party ones, and also can be those providing proper products.

Further, vendor information of vendors is stored in the memory chip 17 of a toner cartridge. And even if more vendors come to provide that toner cartridge after the image forming apparatus 1 is manufactured, vendor information of new vendors does not have to be additionally stored in the image forming apparatus 1, but can be additionally stored in the memory chip 17 of a new toner cartridge to be shipped, which is a simple operation.

Further, product data of toner cartridges are obtained from the vendor servers 3, 4 and 5. And even if a vendor decides to change product data, the vendor can immediately reflect that change to the vendor server. Then the latest information obtained from the vendor server 3, 4 and 5 is displayed on the display 62, and a user can select a preferable toner cartridge based on the latest information, which could remove user inconveniences: a user reluctantly has to place an order based on old information, and thereby suffer from the gap in price, availability and etc.

Further, when an order is placed, order information is stored both in the memory 53 and in the memory chip 17 of a toner cartridge. And even if a quality trouble occurs to the toner cartridge, the vendor providing the toner cartridge can be easily identified. Further, the manufacturer of the image forming apparatus 1 can obtain information about the most preferred vendors.

Further, product data are listed on the display 62 of the terminal apparatus 2, according to the mapping order of vendor priority information stored in the memory 53 of the image forming apparatus 1. And the product data can be listed in the order that is favorable to users for example, and even if the listing order needs to be changed after shipping the supply unit, the product data can be easily listed in a different order by rewriting the vendor priority information stored in the memory 53 of the image forming apparatus 1.

Further, product data of products provided from a vendor that is set as the display prohibit vendor is neither obtained nor displayed. And even if a vendor stored in the memory chip 17 of a toner cartridge has a quality trouble, placing an order with this vendor can be disabled by setting this vendor as the display prohibit vendor.

Embodiment—2

Hereinafter, the second embodiment of the present invention will be explained.

The first embodiment described above is configured such that the terminal apparatus 2 obtains product data from the vendor servers 3, 4 and 5, displays the obtained product data, and places an order. Meanwhile, the second embodiment is configured such that the image forming apparatus 1, not the terminal apparatus 2, obtains product data from the vendor servers 3, 4 and 5, displays the obtained product data, and places an order. Since the configuration of the image forming apparatus 1 is already explained above in the first embodiment, another explanation is omitted.

[Operations of the Image Forming Apparatus 1]

Figure 11:
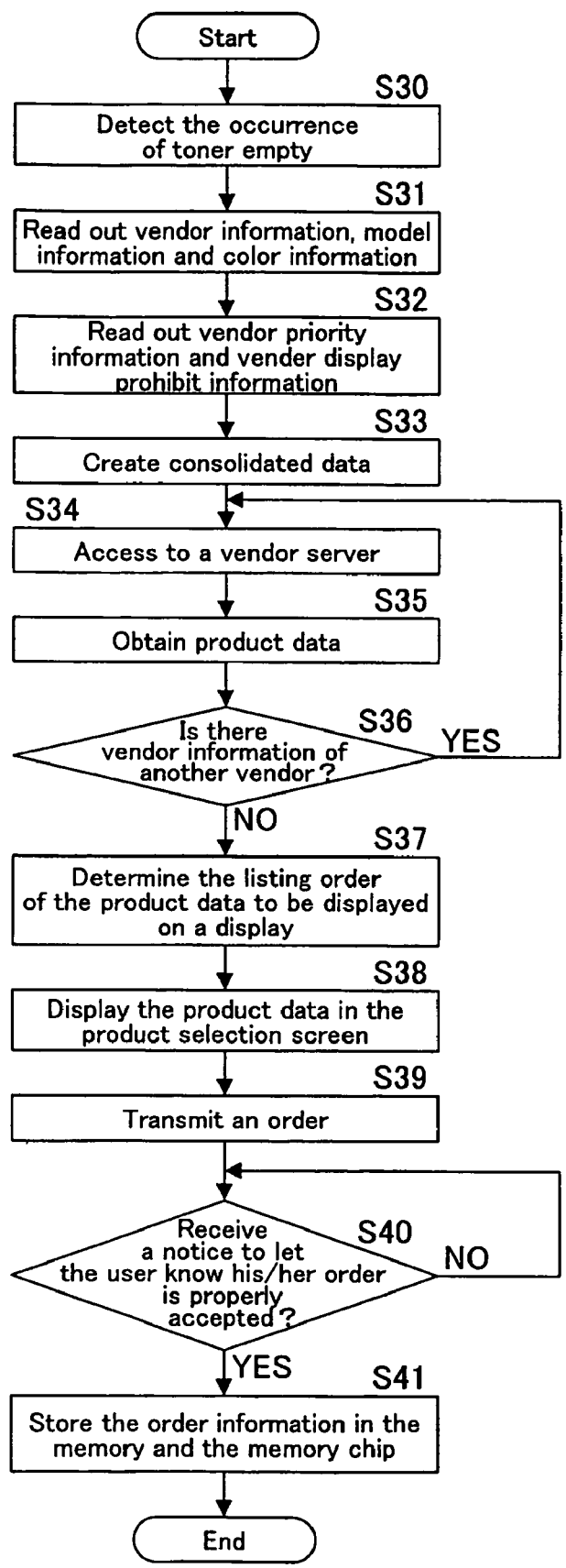
FIG. 11 is a flowchart showing a procedure executed in the image forming apparatus according to the second embodiment of the present invention.

Hereinafter, a procedure executed in the image forming apparatus 1 will be explained with reference to a flowchart shown in FIG. 11. This procedure is executed by the CPU 50 according to an operation program stored in a recording medium such as the ROM 51.

The occurrence of toner empty is detected (Step S30), then vendor information, model information and color information are read out from the memory chip 17 of the toner cartridge 16Y, 16M, 16C or 16K that is out of toner (Step S31).

Subsequently, vendor priority information and vendor display prohibit information are read out from the memory 53 (Step S32), and the consolidated data 112 is created based on the information 110 read out from the memory chip 17 and the information 111 read out from the memory 53, as in the same manner previously explained with FIG. 8 (Step S33).

Then, an access to the vendor server 3 owned by one of the vendors included in the vendor information of the consolidated data 112, is made according to the vendor information thereof (Step S34), and product data (model number, price, availability, time required for delivery and etc.) matching the model name and the toner color of a toner cartridge to be replaced, is obtained from the vendor server 3 (Step S35). Subsequently, it is judged whether or not there is vendor information of another vendor in the consolidated data 112 (Step S36). If there is data of another vendor (YES in Step S36), the routine returns to Step S34, and wherein an access to the vendor server 4 owned by that vendor is made according to the vendor information (Step S34) and product data is obtained (Step S35). The routine repeats Steps S34 through S36 until there is no data of another vendor.

If there is no data of another vendor (NO in Step S36), the listing order of the product data to be displayed on a display, which are obtained from the respective vendor servers, is determined based on the consolidated data 112 as in the same manner previously explained in the first embodiment (Step S37), and the product selection screen 120 of FIG. 10, which includes the product data, is displayed on the display 58 of the operation panel 55.

Subsequently, a user selects a preferable vendor and issues an instruction to place an order for a toner cartridge via the product selection screen 120, and the image forming apparatus 1 transmits that order to the vendor server 3, 4 or 5 owned by the selected vendor (Step S39). And the routine waits until a notice to let the user know that the order is properly accepted, is received from the vendor server (Step S40). If such a notice is received (YES in Step S40), order information is written both in the memory 53 and in the memory chip 17 of the toner cartridge that is out of toner, in Step S41.

The second embodiment has the same advantages as the first embodiment. As described above in the second embodiment, vendor information of a plurality of vendors is preliminarily stored in the memory chip 17 of a toner cartridge, and product information matching the toner cartridge are obtained by making access to respective vendor servers owned by the plurality of vendors according to the vendor information, and then the product data are displayed on the display 58. And a user can select a preferable toner cartridge based on the product data of products provided from the plurality of vendors, which are displayed on the display 58, and issue an order instruction. In this way, this second embodiment would bring more choices of toner cartridges.

If the vendor information of the plurality of vendors, which is stored in the memory chip 17 of the toner cartridge, includes data of a third party vendor which product quality guaranteed by the manufacturer of the image forming apparatus 1, a user can freely select a preferable product in pure consideration of price and etc., regardless of whether or not it is proper.

Further, the latest information obtained from the vendor server 3, 4 and 5 is displayed on the display 58, and a user can select a preferable toner cartridge based on the latest information, which could remove user inconveniences: a user reluctantly has to place an order based on old information, and thereby suffer from the gap in price, availability and etc.

Further, when an order is placed, order information is stored both in the memory 53 and in the memory chip 17 of a toner cartridge. And even if a quality trouble occurs to the toner cartridge, the vendor providing the toner cartridge can be easily identified. Further, the manufacturer of the image forming apparatus 1 can obtain information about the most preferred vendors.

Further, product data are listed on the display 58 according to the mapping order of vendor priority information stored in the memory 53. And the product data can be listed in the order that is favorable to users for example, and if the listing order needs to be changed after shipping the supply unit, the product data can be easily listed in a different order by rewriting the vendor priority information stored in the memory 53 of the image forming apparatus 1. Further, product data of a vendor that is set as the display prohibit vendor, is not displayed.

Those explained above relates to the preferred embodiments of the present invention. However, the present invention is not limited thereto.

For example, in these embodiments above, an order for another toner cartridge is placed when toner empty occurs to the toner cartridge 16Y, 16M, 16C and 16K. However, the present invention is also applied to the case in which an order for a supply unit other than a toner cartridge is placed when the imaging units 18Y, 18M, 18C and 18K reach to the end of usefulness. In this case, vendor information stored in the memory chip 30 of an imaging unit that reaches to the end of usefulness, is read out therefrom, and after placing an order, order information is stored in the memory chip 30 thereof.

Further, it is not necessarily configured such that vendor information of a plurality of vendors providing a supply unit is read out from the memory chip 17 or 30 of the supply unit, at the timing of occurrence of toner empty or at the timing of coming of the end of usefulness or etc., indicated by life information. Alternatively, it can be configured such that vendor information is read out at a certain timing other than those, for example, the timing of a user's giving an instruction via the image forming apparatus 1 or the terminal apparatus 2.

Further, in these embodiments above, order information is stored both in the memory 53 of the image forming apparatus 1 and the memory chip 17 or 30 of a supply unit, after placing an order. Alternatively, it can be configured such that order information is stored in either of them; in the memory 66 of the terminal apparatus 2; or in an existing storage other than the memory 53 of the image forming apparatus 1, the memory 66 of the terminal apparatus 2, the memory chips 17 and 30 of a supply unit.

Further, in the first and second embodiments above, for example, a MFP is employed as the image forming apparatus. Alternatively, as a matter of course, the present invention can be applied to any other image forming apparatus such as a copier, a printer or etc., only if it uses supply units.

Further, in the first and second embodiments above, vendor priority information and vendor display prohibit information (shown in FIG. 5) are stored in the memory 53 of the image forming apparatus 1. Alternatively, those information can be stored in a memory loaded on an apparatus other than the image forming apparatus 1, for example, in a memory loaded on a server owned by a manufacturer thereof.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A supply unit ordering system comprising:
   an image forming apparatus comprising:
      a readout portion that reads out from a memory of a supply unit that is replaceably loaded on the image forming apparatus itself, first information about a plurality of vendors providing the supply unit, which is stored in the memory; and
      a transmitter that transmits to a terminal apparatus, the first information about the plurality of vendors readout by the readout portion;
   a terminal apparatus comprising:
      an obtainer that obtains second information about the supply unit from respective servers owned by the vendors, by making access to the respective servers according to the first information about the plurality of vendors, which is received from the image forming apparatus;
      a display that displays on itself, the obtained second information about the supply unit; and
      an ordering portion that transmits an order for a supply unit to one of the servers, according to an order instruction issued by a user based on the second information about the supply unit displayed by the display; and
   a storage that stores in itself, information about a vendor that owns the one of the servers receiving the order transmitted by the ordering portion.

2. The supply unit ordering system recited in claim 1, wherein the image forming apparatus further comprises a memory that stores in itself, vendor priority information indicating the listing order of the second information about the supply unit, to be displayed on the display of the terminal apparatus, and the display of the terminal apparatus displays on itself, the second information about the supply unit in the listing order indicated by the vendor priority information stored in the memory.

3. The supply unit ordering system recited in claim 1, wherein the image forming apparatus further comprises a storage that stores in itself, information of a vendor which second information about the supply unit is prohibited from being displayed, and relating to the vendor which second information about the supply unit is prohibited from being displayed, and the display of the terminal apparatus does not display on itself the second information about the supply unit.

4. The supply unit ordering system recited in claim 1, wherein the second information about the supply unit, which is obtained from the respective servers owned by the vendors, is at least one of specifications, availability, time required for delivery and prices of supply units.

5. The supply unit ordering system recited in claim 1, wherein the first information about the plurality of vendors providing the supply unit, is stored in a ROM area of the memory of the supply unit.

6. The supply unit ordering system recited in claim 1, wherein the readout portion of the image forming apparatus reads out from the memory of the supply unit, the first information of the plurality of vendors providing the supply unit, at the timing of coming of the time determined based on life information of the supply unit, and/or at the timing of a user's giving an instruction.

7. The supply unit ordering system recited in claim 1, wherein the storage is loaded on the image forming apparatus.

8. The supply unit ordering system recited in claim 1, wherein the storage is the memory of the supply unit.

* * * * *